United States Patent
Cayley, Jr. et al.

(10) Patent No.: US 12,275,113 B2
(45) Date of Patent: Apr. 15, 2025

(54) METHOD AND APPARATUS FOR DELIVERING WORKPIECES TO AND FROM A MACHINE TABLE

(71) Applicant: MIDACO CORPORATION, Elk Grove Village, IL (US)

(72) Inventors: Michael P Cayley, Jr., Schaumburg, IL (US); Vincent P. Storelli, Chicago, IL (US)

(73) Assignee: MIDACO CORPORATION, Elk Grove Village, IL (US)

( * ) Notice: Subject to any disclaimer, the term of this patent is extended or adjusted under 35 U.S.C. 154(b) by 448 days.

(21) Appl. No.: 17/841,273

(22) Filed: Jun. 15, 2022

(65) Prior Publication Data

US 2022/0395948 A1 Dec. 15, 2022

Related U.S. Application Data

(60) Provisional application No. 63/210,809, filed on Jun. 15, 2021.

(51) Int. Cl.
*B23Q 7/02* (2006.01)
*B23Q 7/14* (2006.01)

(52) U.S. Cl.
CPC ............. *B23Q 7/02* (2013.01); *B23Q 7/1426* (2013.01)

(58) Field of Classification Search
CPC ....... B23Q 7/02; B23Q 7/1426; B23Q 7/1431
USPC ............................................ 198/346.1–346.2
See application file for complete search history.

(56) References Cited

U.S. PATENT DOCUMENTS

| | | | | |
|---|---|---|---|---|
| 4,480,738 A | * | 11/1984 | Mattson | B23Q 7/1431 198/465.1 |
| 4,712,283 A | * | 12/1987 | Bertorello | B23Q 7/1431 198/339.1 |
| 5,099,981 A | * | 3/1992 | Guzzoni | B23Q 7/1431 198/346.2 |
| 5,131,125 A | * | 7/1992 | Coron | B23Q 11/085 29/33 P |
| 5,370,212 A | * | 12/1994 | Mizutani | B23Q 7/1431 198/465.1 |
| 5,915,916 A | * | 6/1999 | Saji | F16H 25/2418 198/860.3 |
| 6,193,048 B1 | * | 2/2001 | Keith | B23Q 7/1431 198/465.1 |
| 6,308,815 B1 | | 10/2001 | Keith | |
| 7,108,647 B2 | * | 9/2006 | Nakazawa | B23Q 3/15536 29/33 P |
| 8,474,599 B2 | | 7/2013 | Keith et al. | |
| 9,144,870 B2 | | 9/2015 | Cayley, Sr. et al. | |
| 9,950,867 B2 | | 4/2018 | Cayley, Sr. et al. | |
| 10,486,278 B2 | | 11/2019 | Cayley, Sr. et al. | |

(Continued)

*Primary Examiner* — Mark A Deuble
(74) *Attorney, Agent, or Firm* — Pauley Erickson & Swanson

(57) ABSTRACT

An apparatus and a method for delivering a workpiece to and from a machine table. The apparatus includes a rotatable plate and a pallet. The workpiece is detachably mountable to the pallet. The rotatable plate is movable with respect to the pallet. The pallet is movable along a pallet carriage. A screw is movably mounted within the screw housing and the screw housing is connected to the pallet. A driver is attached to the screw and moves the screw within the screw housing and the driver operates to engage the screw and move the pallet in a linear direction to and from the machine table.

17 Claims, 1 Drawing Sheet

(56) References Cited

U.S. PATENT DOCUMENTS

| | | |
|---|---|---|
| 10,556,312 B2 | 2/2020 | Cayley, Sr. et al. |
| 10,792,777 B2 | 10/2020 | Cayley, Sr. et al. |
| 2022/0111475 A1 | 4/2022 | Cayley, Jr. et al. |

* cited by examiner

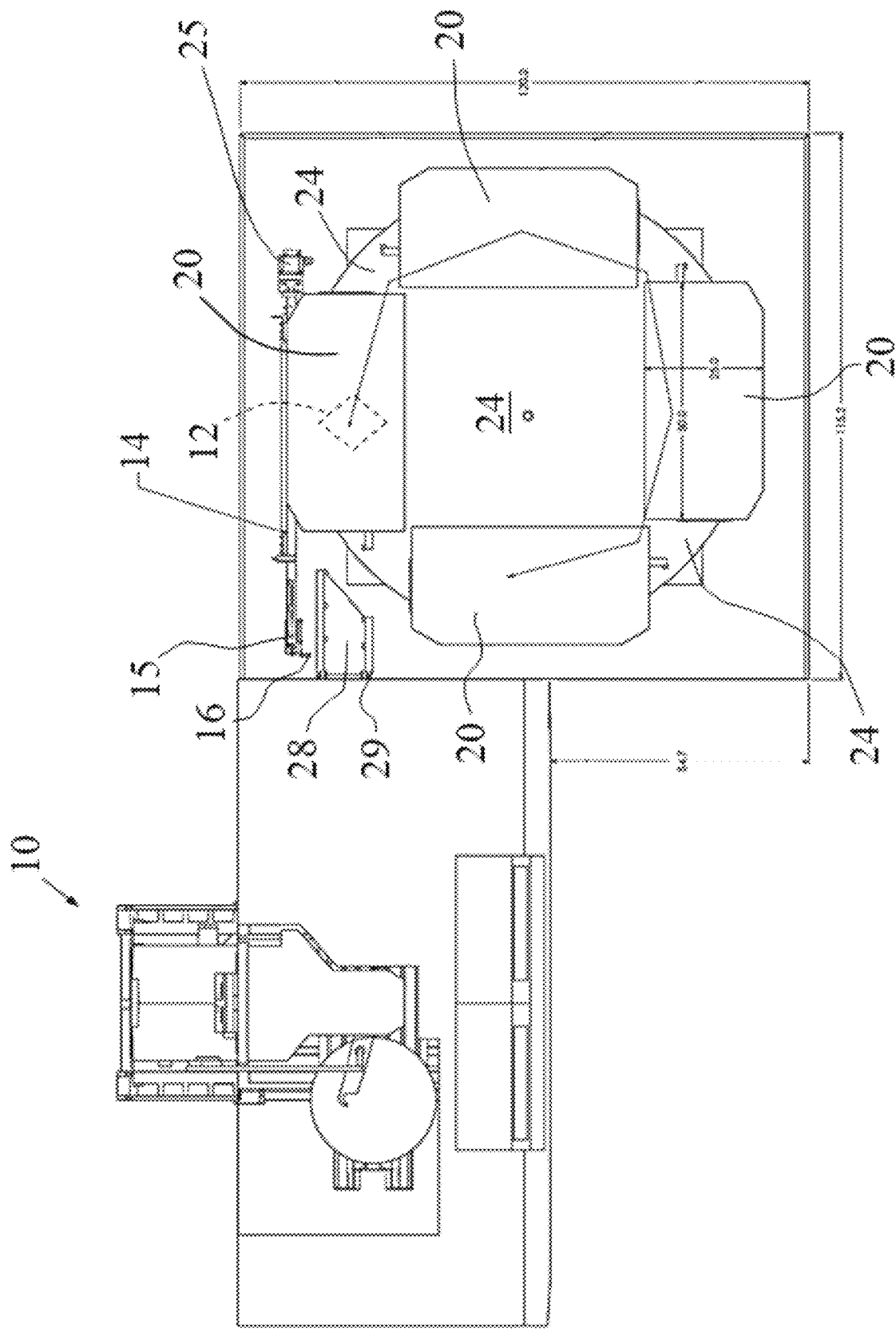

METHOD AND APPARATUS FOR DELIVERING WORKPIECES TO AND FROM A MACHINE TABLE

CROSS REFERENCE TO RELATED APPLICATION

This application claims the priority benefit of Provisional U.S. Patent Application Ser. No. 63/210,809, filed on 15 Jun. 2021. This Provisional U.S. Patent Application, in its entirety, is incorporated by reference into this specification and is made a part hereof, including but not limited to those portions which specifically appear hereinafter.

BACKGROUND OF THE INVENTION

Field of the Invention

This invention relates to a rotatable table or plate that can be used to move or deliver workpieces to and from a machine table.

Discussion of Related Art

Many different known devices and methods are used to transfer workpieces mounted on a pallet, to and from a machine table, such as on a CNC machine. For example, Cayley, Sr. et al., U.S. Pat. Nos. 9,950,867 and 10,486,278, the entire disclosures of which are incorporated into this specification by reference thereto, describe a delivery system and receiver for moving workpieces. Also, for example, Cayley, Sr. et al., U.S. Pat. Nos. 9,144,870 and 10,556,312, the entire disclosures of which are incorporated into this specification by reference thereto, describe different methods and apparatuses that move workpieces with respect to a machine table. Keith et al., U.S. Pat. No. 8,474,599 and Keith, U.S. Pat. No. 6,308,815, the entire disclosures of which are incorporated into this specification by reference thereto, describe different methods and apparatuses for moving pallets with respect to a machine table.

SUMMARY OF THE INVENTION

The apparatus and method of this invention can be used to easily and efficiently deliver workpieces to a machine table, particularly so that the workpiece can be worked and/or otherwise modified at the machine table and then returned to the plate or table. It is one object of this invention to provide a table or plate that can be rotated with respect to a pallet and move the pallet in a linear direction to deliver the workpiece to and from the machine table, for loading and unloading the machine table.

BRIEF DESCRIPTION OF THE DRAWINGS

Different objects of this invention can be accomplished with certain methods and apparatuses for delivering and receiving workpieces at a machine table, according to different embodiments of this invention, wherein:

FIG. 1 shows a plan view of a rotational table or plate and a delivery system for transferring workpieces to and from a machine table, according to some embodiments of this invention.

DETAILED DESCRIPTION OF THE INVENTION

FIG. 1 shows a plan view of a movable and/or rotational plate 24 and/or another suitable table and a cooperative delivery system, for example, for transferring workpieces 12 to and from machine table 10, according to some embodiments of this invention. FIG. 1 shows an apparatus and method for moving pallet 20, with or without an attached workpiece 12, for example, that can deliver workpiece 12 to and from machine table 10. As shown in FIG. 1, only one pallet 20 has attached workpiece 12 which can be transferred to and from machine table 10. In other embodiments of this invention, two or more pallets 20 can have a correspondingly attached workpiece 12.

In some embodiments according to this invention, workpiece 12 can be secured, connected, attached and/or otherwise held in a position, preferably a fixed position, with respect to pallet 20. In some embodiments of this invention machine table 10 can be a CNC machine and/or any other suitable device or machine that delivers workpiece 12 attached to pallet 20 to be worked and/or modified at machine table 10. Then, the worked and/or modified workpiece 12 can be delivered and/or transferred back to plate 24 and the process and/or method can be repeated or performed again with another different workpiece 12 attached and/or otherwise connected to another different pallet 20.

As shown in FIG. 1, any suitable movable bearing can be mounted between an outer surface of plate 24 and an underside surface of each pallet 20. In some embodiments according to this invention, a roller bearing is mounted between plate 24 and each pallet 20, so that each pallet 20 can move with respect to plate 24. Each pallet 20 can move in a counterclockwise or a clockwise direction about or with respect to plate 24. As shown in FIG. 1, each pallet 20 can be rotated in increments, such as 90° increments, to bring differently loaded workpieces 12 on different pallets 20 into a loading position, for example to be driven by servo motor 25.

In some embodiments of this invention, as shown in FIG. 1, the uppermost pallet 20 is in a position and can be delivered to and from machine table 10, such as for loading and unloading attached workpiece 12 to be worked and/or modified at machine table 10. According to some embodiments of this invention, servo motor 25 operates and moves and/or transfers pallet 20 with a loaded or attached workpiece 12 to and from machine table 10. In some embodiments of this invention, servo motor 25, screw 14 and screw housing 15 are used to operate, engage and/or move pallet 20 with attached workpiece 12 so that pallet 20 slides, glides and/or otherwise moves along pallet carriage 28. In some embodiments of this invention, pallet carriage 28 includes or has roller bearings 29 that can be rotatably and/or otherwise movably mounted with respect to pallet carriage 28, particularly so that pallet 20 can easily ride along or be transferred along pallet carriage 28, to move pallet 20 and attached workpiece 12 to and from machine table 10, for example, to load and unload workpiece 12 at machine table 10.

According to some embodiments of this invention, screw housing 15 has pin 16 that can be used to engage a part of pallet 20, for example, to move pallet 20 with attached workpiece 12 to and from machine table 10. In some embodiments, pallet 20 moves in a linear or a generally linear direction to and from machine table 10. In some embodiments, pallet 20 moves in a linear direction, a perpendicular direction and/or any other suitable angular direction with respect to the linear direction, to and from machine table 10. Any other suitable device and/or method can be used to move or transfer each pallet 20 to and from machine table 10, in any suitable direction.

In some embodiments according to this invention, as shown in FIG. 1, servo motor 25, screw 14, screw housing 15 and/or pin 16 can be positioned outside of or at an exterior of plate 24.

In some embodiments according to this invention, pallet 20 can have any suitable size, depending upon the particular use of pallet 20 with attached workpiece 12. For example, as shown in FIG. 1, the size of pallet 20 is 50"×25". It is apparent that any other suitable size of pallet 20 can be used and still accomplish the same results of this invention.

While in the foregoing specification this invention has been described in relation to certain preferred embodiments, and many details are set forth for purpose of illustration, it will be apparent to those skilled in the art that this invention is susceptible to additional embodiments and that certain of the details described in this specification and in the claims can be varied considerably without departing from the basic principles of this invention.

What is claimed is:

1. An apparatus for delivering a workpiece to and from a machine table, the apparatus comprising:
a rotatable plate, a pallet, the workpiece detachably mountable to the pallet, the rotatable plate movable with respect to the pallet, a pallet carriage, the pallet movable along the pallet carriage, a screw housing, a screw movably mounted within the screw housing, the screw housing connected to the pallet, a driver attached to the screw and moving the screw within the screw housing, the driver operating to engage the screw and move the pallet in a linear direction to the machine table, and the pallet can move in a clockwise or a counterclockwise direction with respect to the rotatable plate.

2. The apparatus according to claim 1, wherein the screw housing is connected to the pallet by a pin connected to the screw housing and the pin is removably engageable with the pallet to move the pallet to and from the machine table.

3. The apparatus according to claim 1, wherein the rotatable plate houses a plurality of the pallets.

4. The apparatus according to claim 1, wherein a movable bearing is attached to the pallet carriage and the movable bearing contacts a surface of the pallet.

5. The apparatus according to claim 1, wherein the driver is a servo motor that moves the screw housing in the linear direction of the pallet to and from the machine table.

6. The apparatus according to claim 1, wherein the driver is operated to move the pallet in the linear direction to and from the machine table.

7. The apparatus according to claim 1, wherein a movable bearing is mounted between an outer surface of the rotatable plate and an underside surface of the pallet.

8. The apparatus according to claim 1, wherein the screw, the screw housing and the driver are positioned outside of an exterior of the rotatable plate.

9. An apparatus for delivering a workpiece to a machine table, the apparatus comprising:
a rotatable plate, a pallet, the workpiece connected to the pallet, the rotatable plate movable with respect to the pallet, a screw housing, a screw movably mounted within the screw housing, the screw housing connected to the pallet, a driver attached to the screw and moving the screw within the screw housing and operating and engaging the screw and moving the pallet in a linear direction to the machine table, and the pallet can move in a clockwise or a counterclockwise direction with respect to the rotatable plate.

10. The apparatus according to claim 9, wherein the screw housing is connected to the pallet by a pin connected to the screw housing and the pin is engaging with the pallet to move the pallet to and from the machine table.

11. The apparatus according to claim 9, wherein a movable bearing is mounted between an outer surface of the rotatable plate and an underside surface of the pallet.

12. The apparatus according to claim 9, wherein the screw, the screw housing and the driver are positioned outside of an exterior of the rotatable plate.

13. A method for delivering a workpiece to and from a machine table, the method including the steps of:
rotating a rotatable plate with respect to a pallet;
detachably mounting the workpiece to the pallet;
moving the pallet along a pallet carriage;
movably mounting a screw within a screw housing;
connecting the screw housing to the pallet;
driving the screw and moving the screw within the screw housing; operating the driver to engage the screw and move the pallet in a linear direction to the machine table; and
the pallet moves in a clockwise or a counterclockwise direction with respect to the rotatable plate.

14. The method according to claim 13, wherein the screw housing is connected to the pallet by a pin connected to the screw housing and the pin is removably engageable with the pallet to move the pallet to and from the machine table.

15. The method according to claim 13, wherein the driver is a servo motor that moves the screw and the screw housing in the linear direction to and from the machine table.

16. The method according to claim 13, wherein a movable bearing is mounted between an outer surface of the rotatable plate and an underside surface of the pallet.

17. The method according to claim 13, wherein the screw, the screw housing and the driver are positioned outside of an exterior of the rotatable plate.

* * * * *